Patented Aug. 5, 1952

2,605,907

UNITED STATES PATENT OFFICE 2,605,907

RACK FOR TOAST AND THE LIKE

Arthur Hirst, Lancing, England

Application February 5, 1947, Serial No. 726,626
In Great Britain September 13, 1945

Section 1, Public Law 690, August 8, 1946
Patent expires September 13, 1965

5 Claims. (Cl. 211—120)

The present invention has reference to a new or improved article for use as a rack for toast, biscuits and the like.

The article according to the invention comprises an extensible helix of wire or other suitable resilient material provided at its ends with hooks or with spring clips adapted to be engaged with the rim of a plate or the like.

The hooks or clips may be attached to the ends of the helix, below the axis of the latter, in locking manner in relation thereto whereby outward turning of the hooks or clips relatively to the said ends produces fanning out of the turns of the helix. Alternatively the hooks or clips may be attached to the ends of the helix above the axis thereof whereby an outward pull on the clips produces fanning out of the turns of the helix as well as the extension of the helix.

The hooks or clips are preferably attached to the helix in pivotal manner to enable them to fold into the hollow of the helix when the article is not in use.

The helix and hooks or clips may be of stainless steel wire, spring wire suitably plated or coated with plastic, or the like and is preferably so made that the turns collapse one against another when the clips are free of the plate rim. Thus, when the rack is attached to a plate the clips are pulled towards each other. The rack, being extensible, can be applied to any one of a number of plates of different size. The clips may be so fashioned that they grip the plate rim or simply press against the periphery of the rim or press against the underside thereof.

The ends of a resilient bail handle may be attached either to the helix, say at the end loops thereof, or to the clips.

Examples of construction of the article according to the invention will now be described with reference to the accompanying drawings wherein.

Figure 1:
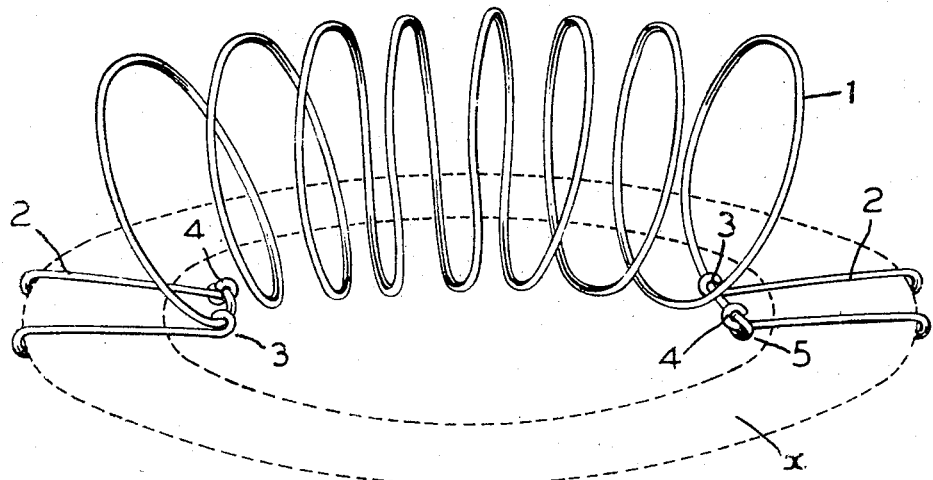
Fig. 1 is a perspective view of the article applied to a plate $x$.
Figure 2:
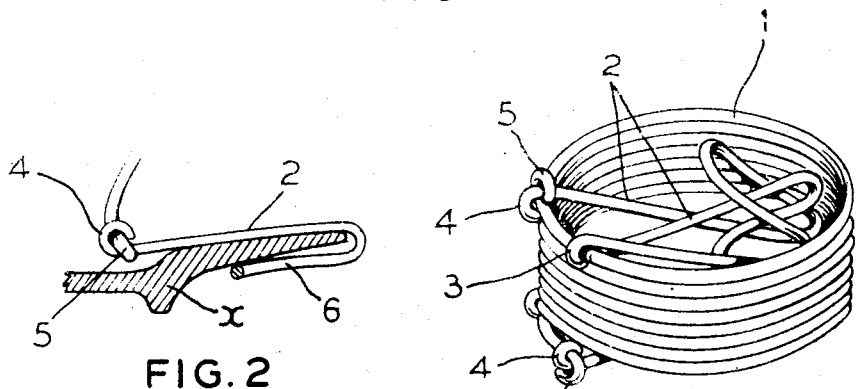
Fig. 2 is a fragmentary view showing a clip in engagement with the rim of a plate, the clip being shown partly in section and that part of the plate shown being in section.
Figure 3:
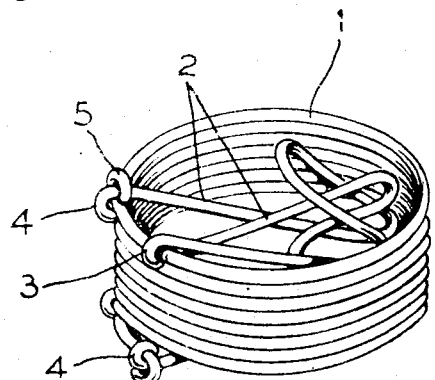
Fig. 3 is a perspective view of the article collapsed (out of use)

The said article shown in Figs. 1 to 3 comprises a helix 1 of spring wire or other suitable resilient material to the ends of which spring clips 2 of wire or the like are attached. The attachment of the clips to the helix is effected by looping one end of each wire or the like forming a clip round the wire of the helix near the extremity thereof as indicated at 3 and interlooping the other end of the said wire forming the clip with the corresponding extremity of the helix, as shown at 4 and 5, respectively, the attachment being below the axis of the helix. This arrangement provides a pivotal connection between the clips and the helix which permits the clips to be folded into the hollow of the contracted helix, as shown in Fig. 3, and to be freely turned outwards until the wire at the commencement of the loops 4 engages with diagonally opposite parts of the loops 5 (see Fig. 2, more especially). Thereafter outward turning of the clips causes the turns of the helix to fan out, owing to the interlocking which takes place between the loops 4 and 5 at the ends of the helix; and the clips hold the helix so fanned when they are applied to the plate rim, the helix being extended, as shown in Fig. 1.

Those parts of the clips which lie beneath the plate rim are curved upwards and downwards, as shown at 6, Fig. 2, in order to ensure a good grip on the plate rim. Owing to this gripping action of the clips they may be located at the ends of a chord of the plate instead of at the ends of a diameter as shown in Fig. 1. This is an advantage when the user wishes to employ a large plate either for the reception of a single rack or for the reception of two racks.

Figure 4:
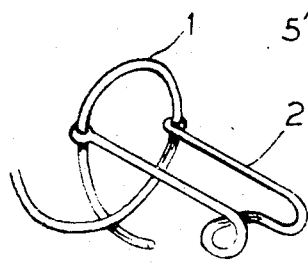
Fig. 4 is a detail illustrating another embodiment of the invention.

Instead of the interlocking action between the loops 4 and 5 being provided for causing the turns of the helix to fan out when the clips are turned outwards as described with reference to Figs. 1 to 3, the clips 2 may be attached to the end turns of the helix 1 at points above the axis thereof as shown in Fig. 4.

From the above it will be evident that the invention provides an article for use as a toast rack which can be easily and cheaply made, can be easily cleaned and, when in use, is attached to the plate as distinct from simply being stood on it, the plate providing a crumb receptacle.

What I claim is:

1. A toast rack or the like comprising a normally contracted spring helix, and support means pivotally attached to the respective end portions of said helix and swingable to positions longitudinally of the helix for the expansion thereof, said support means having a length less than the diameter of the helix and swingable within the confines of the helix for storage.

2. A toast rack or the like comprising a normally contracted spring helix, support means for said helix, and means pivotally connecting said support means to the end portions of said helix below the axis thereof and including means limiting the pivotal movement of said support means to angles less than that which is parallel to the axis of said helix, whereby drawing apart of said support means and swinging said means to positions substantially parallel to the helix axis will expand and fan-out the coils of the helix.

3. A toast rack or the like comprising a normally contracted spring helix, the end portions of said helix relatively overlapping a small portion of the periphery of the helix, support means pivotally mounted on said end portions, and the ends of said helix being turned over and overlying the pivotal mounting of said support means to limit the pivotal movement of said support means, to angles less than that which is parallel to the axis of said helix, whereby drawing apart of said support means and swinging said means to positions substantially parallel to the helix axis will expand and fan-out the coils of the helix.

4. A toast rack or the like as defined in claim 3 wherein said support means includes U-shaped clips for engaging the edge of a plate.

5. A toast rack or the like as defined in claim 3 wherein said support means includes a pair of support rods, the ends of said rods being formed in loops surrounding the end portions of said helix, the turned over ends of said helix being looped around the adjacent rod loops and retaining said support means on said helix end portions.

ARTHUR HIRST.

REFERENCES CITED

The following references are of record in the file of this patent:

UNITED STATES PATENTS

| Number | Name | Date |
| --- | --- | --- |
| 356,315 | Hunt | Jan. 18, 1887 |
| 439,210 | Thome | Oct. 28, 1890 |
| 501,196 | Taylor | July 11, 1893 |
| 548,027 | Bernhard | Oct. 15, 1895 |
| 642,277 | Adair | Jan. 30, 1900 |
| 1,258,792 | Lorimer | Mar. 12, 1918 |
| 1,434,532 | Davala | Nov. 2, 1922 |
| 1,453,437 | Burnham | May 1, 1923 |
| 1,487,942 | Hines | Mar. 25, 1925 |
| 1,588,471 | Bezkorowajnyj | June 15, 1926 |
| 2,137,369 | Terry | Nov. 22, 1938 |

FOREIGN PATENTS

| Number | Country | Date |
| --- | --- | --- |
| 41,629 | Norway | July 13, 1925 |